F. McM. SAWYER.

BUILDING BLOCK.

APPLICATION FILED APR. 1, 1912.

Reissued Dec. 8, 1914. 13,844.

Witnesses:
J. Frundenwolf
J. L. Lloyd

Inventor
Frank McM. Sawyer
By his Attorneys
Prindle & Wright

THE NORRIS PETERS CO., PHOTO-LITHO., WASHINGTON, D. C.

UNITED STATES PATENT OFFICE.

FRANK McMURRAY SAWYER, OF CHARLOTTE, NORTH CAROLINA, ASSIGNOR TO AMERICAN ROOFING TILE COMPANY, A CORPORATION OF NORTH CAROLINA.

BUILDING-BLOCK.

13,844. Specification of Reissued Letters Patent. Reissued Dec. 8, 1914.

Original No. 812,369, dated February 13, 1906, Serial No. 249,256. Reissue No. 12,698, dated October 1, 1907, Serial No. 386,675. This application for reissue filed April 1, 1912. Serial No. 687,946.

*To all whom it may concern:*

Be it known that I, FRANK McMURRAY SAWYER, a citizen of the United States, residing at Charlotte, in the county of Mecklenburg and State of North Carolina, have invented certain new and useful Improvements in Building-Blocks; and I do declare the following to be a full, clear, and exact description of the invention, such as will enable others skilled in the art to which it appertains to make and use the same.

This invention relates to building blocks; and one of the principal objects of the same is to provide a molded artificial stone building block or brick which will provide smooth, unbroken outer and inner surfaces to a wall and which will produce vertical ventilating openings or air-passages leading from the bottom to the top of the wall.

Another object is to provide a building block or brick which can be manufactured at slight cost, which will break joints when laid and in which the corners of the wall will be braced and tied, owing to the contour of the blocks and the manner in which the same are laid in forming the wall.

These and other objects are attained by means of the form of my invention illustrated in the accompanying drawings, in which—

Figure 1:
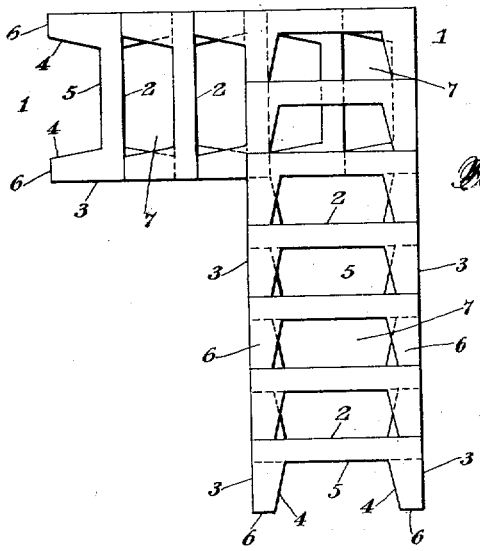
Figure 2:
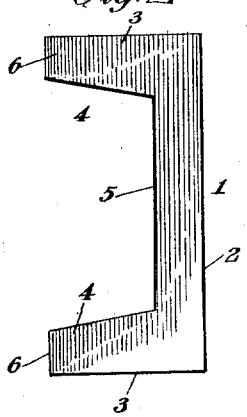
Figure 3:
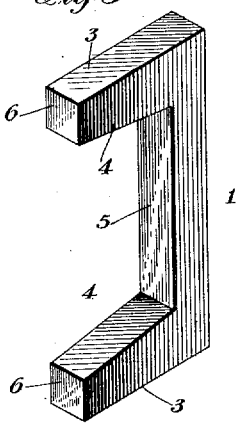

Figure 1 is a plan view of a wall in the course of construction built with building blocks made in accordance with my invention; Fig. 2 is a plan view of one of my blocks or bricks; and, Fig. 3 is a perspective view of the same.

Referring to the drawings for a more detailed description of my invention, I construct a building block or brick 1 which may be molded of cement and sand or other plastic material, said block having a plain side surface 2, extending entirely across the brick, end surfaces 3, which are also unbroken, a recessed side having oblique walls 4 upon the inside of the block, and an inner surface 5 connecting the oblique surfaces, thus forming two substantially rectangular feet 6. Owing to the contour and dimensions of the blocks, a wall can be built by the use of these blocks in which the blocks are reversed in each alternate layer, as shown in Fig. 1 of the drawings, so that all the joints will be broken and the blocks firmly tied together, while, at the same time, vertical air-spaces 7 are produced in the walls, the air-spaces in the corners being divided into four equal divisions braced by the webs of the blocks. Furthermore, the blocks made in accordance with my invention are of such a shape as to cause them to overlap one another at all points including the corners of the wall, by a distance equal to the thickness of the blocks. At each corner of the wall the shape of the block is such that when the blocks are reversed in succeeding tiers the inner feet of the last two blocks of one side wall register with the web of one of the blocks in the adjacent tier of blocks. This effect is produced by having the length of the side surface 2 differ in length from the length of one of the end surfaces 3 or a multiple thereof, by a distance equal to the thickness of the web. The exact registry of the inner feet with this web portion is obtained by having the web and feet of substantially the same thickness. While exact proportions of the character above referred to are not essential to obtain the result indicated, the result obtained is determined by constructing the blocks with proportions substantially such as those described. A block made in accordance with my invention is comparatively light in weight, and requires less material to manufacture the same than is required in blocks of other types. Furthermore, by the use of my blocks, the advantages of ventilating walls are attained and at the same time the corners of the walls are braced and tied in a strong and efficient manner.

Various changes in the form, proportion, and the minor details of construction may be resorted to without departing from the principle or sacrificing any of the advantages of my invention.

Having thus described my invention, what I claim as new, and desire to secure by Letters Patent, is:

1. The herein-described building wall having a corner made up of bricks or blocks having three unbroken surfaces 2, 3, 3, the surfaces 3, 3, forming the inner and outer facing of the wall, and a recessed side forming feet 6; the inner walls 4 of which are oblique and providing the inner wall or web 5, said blocks being placed in reverse order in the wall, in each alternate layer to break joint and the alternate layers in the corners being arranged to form crossing webs to provide vertical ventilating spaces 7 between the bricks and bracing webs.

2. The herein described building wall made up of bricks or blocks, each having three unbroken outer surfaces and having its remaining surface recessed, said blocks being reversed in each alternate layer and placed so that their oppositely disposed unbroken surfaces form the inner and outer facings of the wall.

3. The herein described building wall, made up of bricks or blocks, each having three unbroken outer surfaces and having its remaining surface recessed, said blocks being reversed in each alternate layer and placed so that their oppositely disposed surfaces form the inner and outer facings of the wall and so that the portions connecting said oppositely disposed surfaces register vertically with each other.

4. The herein described building wall, made up of bricks or blocks, each having three unbroken outer surfaces and having its remaining surface recessed, said blocks being reversed in each alternate layer and placed so that their oppositely disposed surfaces form the inner and outer facings of the wall and so that the portions connecting said oppositely disposed surfaces register vertically with each other, thus spacing the joints in said outer and inner facings in each alternate layer the thickness of said connecting portions.

5. A building wall having a corner therein, said wall being made up of blocks having a plane side surface and a recessed side forming two feet, the length of one foot being an even factor of a distance differing from the length of the plane side by the thickness of the web, said blocks being crossed at the corner of the wall.

6. A building wall having a corner therein, said wall being made up of blocks having a plane side surface and a recessed side forming two feet, the length of one foot being an even factor of a distance differing from the length of the plane side by the thickness of the web, the web and feet having substantially the same thickness, said blocks being crossed at the corner of the wall.

FRANK McMURRAY SAWYER.

Witnesses:
EVAN ANDERSON,
GEO. F. MILES.

Copies of this patent may be obtained for five cents each, by addressing the "Commissioner of Patents, Washington, D. C."